US012792991B2

(12) United States Patent
Goh et al.

(10) Patent No.: US 12,792,991 B2
(45) Date of Patent: Nov. 10, 2026

(54) METHOD AND DEVICE FOR CONTROLLING VEHICLES TO PERFORM

(71) Applicant: GRABTAXI HOLDINGS PTE. LTD., Singapore (SG)

(72) Inventors: Yong Liang Goh, Singapore (SG); Wee Sun Lee, Singapore (SG); Xiang Hui Nicholas Lim, Singapore (SG)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 49 days.

(21) Appl. No.: 18/260,851

(22) PCT Filed: May 12, 2022

(86) PCT No.: PCT/SG2022/050311

§ 371 (c)(1),
(2) Date: Jul. 10, 2023

(87) PCT Pub. No.: WO2022/240362

PCT Pub. Date: Nov. 17, 2022

(65) Prior Publication Data

US 2024/0078488 A1 Mar. 7, 2024

(30) Foreign Application Priority Data

May 14, 2021 (SG) ............................ 10202105075P

(51) Int. Cl.
*G06Q 10/06* (2023.01)
*G06N 3/04* (2023.01)
(Continued)

(52) U.S. Cl.
CPC ......... *G06Q 10/06316* (2013.01); *G06N 3/04* (2013.01); *G06N 3/092* (2023.01)

(58) Field of Classification Search
None
See application file for complete search history.

(56) References Cited

U.S. PATENT DOCUMENTS

2019/0120640 A1* 4/2019 Ho ..................... G01C 21/3453
2021/0287273 A1* 9/2021 Janakiraman ...... G06Q 30/0623
(Continued)

FOREIGN PATENT DOCUMENTS

CN 110363329 A 10/2019
CN 111754095 A * 10/2020 ......... G06Q 30/0645
KR 10-2194962 B1 12/2020

OTHER PUBLICATIONS

Li, Z., Shen, X., Jiao, Y., Pan, X., Zou, P., Meng, X., Yao, C. and Bu, J., Apr. 2020, Hierarchical bipartite graph neural networks: Towards large-scale e-commerce applications. In 2020 IEEE 36th International Conference on Data Engineering (ICDE) (pp. 1677-1688). IEEE. (Year: 2020).*

(Continued)

*Primary Examiner* — Patricia H Munson
*Assistant Examiner* — Marjorie Pujols-Cruz
(74) *Attorney, Agent, or Firm* — Maschoff Brennan

(57) ABSTRACT

Aspects concern a method for controlling vehicles to perform transport tasks comprising supplying information about vehicles and information about transport tasks to a graph neural network by associating each vehicle with a vehicle graph node and each transport task with a transport task graph node, processing the vehicle and the transport graph by the neural network, wherein the neural network determines a feature for each graph node, determining, for each pair of a transport graph node and vehicle graph node, a weight representing a similarity between the features determined for the transport graph node and the vehicle graph node, selecting an assignment between the transport graph nodes and the vehicle graph nodes from a set of possible assignments, wherein the selected assignment maximizes the sum of the weights of the pairs and controlling each vehicle according to the selected assignment.

13 Claims, 6 Drawing Sheets

(51) Int. Cl.
*G06N 3/092* (2023.01)
*G06Q 10/0631* (2023.01)

(56) References Cited

U.S. PATENT DOCUMENTS

| | | | | |
|---|---|---|---|---|
| 2021/0312280 | A1* | 10/2021 | Taitler | G06N 3/08 |
| 2021/0334722 | A1* | 10/2021 | Di Lorenzo | G06Q 10/00 |
| 2022/0270488 | A1* | 8/2022 | Tang | G06N 3/084 |

OTHER PUBLICATIONS

Nurseptiani, A., Satria, Y. and Burhan, H., Mar. 2021, Application of agglomerative hierarchical clustering to optimize matching problems in ridesharing for maximize total distance savings. In Journal of Physics: Conference Series (vol. 1821, No. 1, p. 012016). IOP Publishing. (Year: 2021).*

Gammelli, D., Yang, K., Harrison, J., Rodrigues, F., Pereira, F.C. and Pavone, M., Dec. 2021, Graph neural network reinforcement learning for autonomous mobility-on-demand systems. In 2021 60th IEEE Conference on Decision and Control (CDC) (pp. 2996-3003). IEEE. (Year: 2021).*

Yu, Z. and Hu, M., 2021. Deep reinforcement learning with graph representation for vehicle repositioning. IEEE Transactions on Intelligent Transportation Systems, 23(8), pp. 13094-13107. (Year: 2021).*

International Search Report and Written Opinion dated Sep. 28, 2022 which was issued in connection with PCT/SG2022/050311.

Wikipedia—Genetic algorithm. Feb. 19, 2018 See whole document Citation is not enclosed due to copyright restrictions. A copy may be obtained from the Wayback Machine at https://web .archive .org/web/20180219170320/ https://en.wikipedia .org/Wiki/Gene tic_ algorithm. [Retrieved on Aug. 29, 2022].

Wikipedia—Hungarian algorithm. Oct. 20, 2017 See whole document Citation is not enclosed due to copyright restrictions. A copy may be obtained from the Wayback Machine at https://web.archive. org/web/20171020174422/ https://en.wikipedia.org/Wiki/Hung arian_ algorithm. [Retrieved on Aug. 29, 2022].

Wikipedia—Assignment problem. May 5, 2018 See whole document Citation is not enclosed due to copyright restrictions. A copy may be obtained from the Wayback Machine at https:/ /web .archive.org/web/20180505202539/ https://en.wikipedia .org/Wiki/ Assignment_problem. [Retrieved on Aug. 30, 2022].

* cited by examiner

METHOD AND DEVICE FOR CONTROLLING VEHICLES TO PERFORM

The present invention is a 371 of International Application No. PCT/SG2022/050311, filed on May 12, 2022, and claiming priority to Singapore Application No. 10202105075P filed on May 14, 2021, incorporated by reference herein in its entirety.

TECHNICAL FIELD

Various aspects of this disclosure relate to methods and devices for controlling vehicles to perform transport tasks.

BACKGROUND

The quality of a transport service largely depends on the assignment of vehicles to transport tasks. Only a suitable vehicle should be is assigned to, for example, a customer, e.g. a vehicle for which the customer does not have to wait too long and which reaches the destination quickly or also a vehicle which is suitable for the transport task with respect to the transport space it provides etc. An example for such a transport service is an e-hailing service which enables customers to hail taxis using their smartphones and the assignment is the assignment of drivers (and thus vehicles, e.g. taxis) to customers. However, such an assignment is also relevant for other transport services, such as an assignment of vans to parcels, bikes or motorbikes or cars to food (for a food delivery service) etc.

Since the assignment of vehicles to transport tasks not only has an impact on the satisfaction of the customer but also on the efficient operation of the transport system (including all transport vehicles), the energy the overall consumption, the carbon footprint etc., efficient approaches for controlling vehicles to perform transport tasks (by a corresponding assignment of the vehicles to the transport tasks) are desirable.

SUMMARY

Various embodiments concern a method for controlling vehicles to perform transport tasks including supplying information about the vehicles and information about the transport tasks to a graph neural network by associating each vehicle with a graph node of a vehicle graph and each transport task with a graph node of a transport task graph, processing the vehicle graph and the transport graph by the neural network, wherein the graph neural network is a neural network trained to determine a feature for each graph node of a graph it processes, determining, for each pair of a graph node of the transport task graph and a graph node of the vehicle graph, a weight representing a similarity between the feature determined for the graph node of the transport task graph and the graph node of the vehicle graph, selecting an assignment between the graph nodes of the transport task graph and the graph nodes of the vehicle graph from a set of possible assignments, wherein the selected assignment maximizes, among the possible assignments, the sum, over the pairs of graph node of the transport task graph and graph node of the vehicle graph node which are assigned to each other, of the weights of the pairs and controlling each vehicle which is assigned to a transport task according to the selected assignment to perform the transport task.

According to one embodiment, each feature is a vector of a predetermined dimension and the weight between the feature determined for the graph node of the transport task graph and the graph node of the vehicle graph is given by the inner product of the feature determined for the graph node of the transport task graph and the graph node of the vehicle graph.

According to one embodiment, selecting the assignment includes applying an assignment problem algorithm to a bipartite graph having the vehicle graph as first graph component, the transport task graph as second graph component, and edges between the first graph component and the second graph component with the determined weights.

According to one embodiment, the assignment problem algorithm is a min-sum or a max-sum algorithm.

According to one embodiment, the assignment problem algorithm has a fixed number of iterations.

According to one embodiment, the assignment problem algorithm is differentiable.

According to one embodiment, the method includes supplying, for each vehicle, the information about the vehicle as one or more input feature values for the graph node of the vehicle graph associated with the vehicle to the neural network, and, for each transport task, the information about the transport task as one or more input feature values for the graph node of the transport task graph associated with the transport task to the neural network.

According to one embodiment, the vehicle graph includes edges between graph nodes depending on the similarity of the input features values of the graph nodes and wherein the transport task graph includes edges between graph nodes depending on the similarity of the input features of the graph nodes.

According to one embodiment, for at least some of the vehicles, the information about the vehicle includes location information of the vehicle.

According to one embodiment, each transport task includes picking up an object of person to transport and, for at least some of the transport tasks, the information about the transport task includes location information about where the object or person needs to be picked up.

According to one embodiment, the graph neural network is trained using reinforcement learning.

According to one embodiment, a method for training a graph neural network is provided including forming training data elements by, for each training element, associating each vehicle of a training set of vehicles with a graph node of a vehicle graph for the training element and each training transport task with a graph node of a transport task graph for the training element, determining a label for the training element by determining a training assignment of the training set of vehicles to the training set of transport tasks and training the graph neural network by for each training data element, processing the vehicle graph and the transport graph by the neural network, determining, for each pair of a graph node of the transport task graph and a graph node of the vehicle graph, a weight representing a similarity between the feature determined for the graph node of the transport task graph and the graph node of the vehicle graph and selecting an assignment between the graph nodes of the transport task graph and the graph nodes of the vehicle graph from a set of possible assignments, wherein the selected assignment maximizes, among the possible assignments, the sum, over the pairs of graph node of the transport task graph and graph node of the vehicle graph node which are assigned to each other, of the weights of the pairs and adjusting the graph neural network to reduce the value of a loss function depending on sum of the differences between the selected assignments and the training assignments over the training data elements, wherein each difference is the difference between the selected assignment and the training assignment for a respective training data element.

According to one embodiment, a transport system controller is provided configured to perform one of the methods described above.

According to one embodiment, a computer program element is provided including program instructions, which, when executed by one or more processors, cause the one or more processors to perform one of the methods described above.

According to one embodiment, a computer-readable medium is provided including program instructions, which, when executed by one or more processors, cause the one or more processors to perform one of the methods described above.

It should be noted that embodiments described in context of one or the methods are analogously valid for the other method and the transport system controller.

BRIEF DESCRIPTION OF THE DRAWINGS

The invention will be better understood with reference to the detailed description when considered in conjunction with the non-limiting examples and the accompanying drawings, in which.

DETAILED DESCRIPTION

The following detailed description refers to the accompanying drawings that show, by way of illustration, specific details and embodiments in which the disclosure may be practiced. These embodiments are described in sufficient detail to enable those skilled in the art to practice the disclosure. Other embodiments may be utilized and structural, and logical changes may be made without departing from the scope of the disclosure. The various embodiments are not necessarily mutually exclusive, as some embodiments can be combined with one or more other embodiments to form new embodiments.

Embodiments described in the context of one of the devices or methods are analogously valid for the other devices or methods. Similarly, embodiments described in the context of a device are analogously valid for a vehicle or a method, and vice-versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles “a”, “an” and “the” as used with regard to a feature or element include a reference to one or more of the features or elements.

As used herein, the term “and/or” includes any and all combinations of one or more of the associated listed items.

In the following, embodiments will be described in detail.

An e-hailing app, typically used on a smartphone, allows its user to hail a taxi (or also a private driver) through his or her smartphone for a trip.

Figure 1:
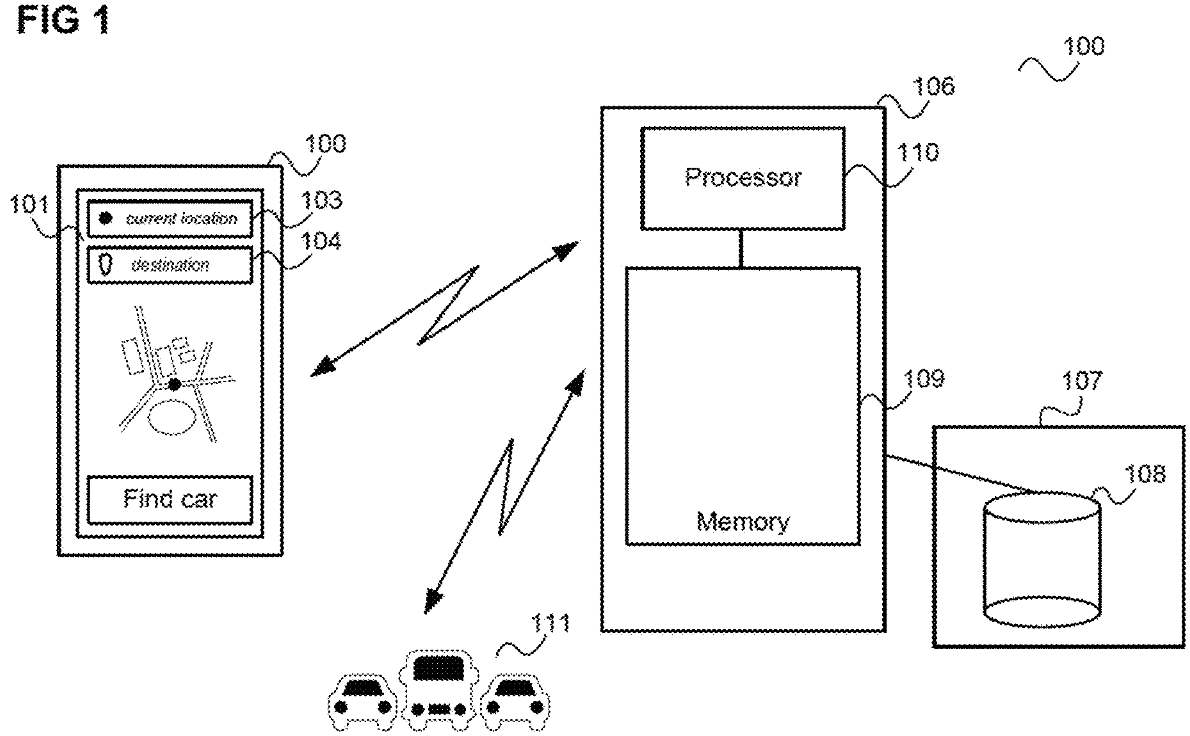
FIG. 1 shows a communication arrangement for usage of an e-hailing service including a smartphone and a server.

FIG. 1 shows a communication arrangement including a smartphone 100 and a server (computer) 106.

The smartphone 100 has a screen showing the graphical user interface (GUI) of an e-hailing app that the smartphone’s user has previously installed on his smartphone and has opened (i.e. started) to e-hail a ride (taxi or private driver).

The GUI 101 includes a map 102 of the vicinity of the user’s position (which the app may determine based on a location service, e.g. a GPS-based location service). Further, the GUI 101 includes a box for point of departure 103 (which may be set to the user’s present location obtained from location service) and a box for destination 104 which the user may touch to enter a destination (e.g. opening a list of possible destinations). There may also be a menu (not shown) allowing the user to select various options, e.g. how to pay (cash, credit card, credit balance of the e-hailing service). When the user has selected a destination and made any necessary option selections, he or she may touch a “find car” button 105 to initiate searching of a suitable car.

For this, the e-hailing app communicates with the server 106 of the e-hailing service via a radio connection. The server 106 may consult a memory 109 or a data storage 108 having information about the current location of registered vehicles 111, about when they are expected to be free, about traffic jams etc. From this, a processor 110 of the server 106 selects the most suitable vehicle (if available, i.e. if the request can be fulfilled) and provides an estimate of the time when the driver will be there to pick up the user, a price of the ride and how long it will take to get to the destination. The server communicates this back to the smartphone 100 and the smartphone 100 displays this information on the GUI 101. The user may then accept (i.e. book) by touching a corresponding button. If the user accepts, the server 106 informs the selected vehicle 111 (or, equivalently, its driver), i.e. the vehicle the server 106 has allocated for fulfilling the transport request.

It should be noted while the server 106 is described as a single server, its functionality, e.g. for providing an e-hailing service for a whole city, will in practical application typically be provided by an arrangement of multiple server computers (e.g. implementing a cloud service). Accordingly, the functionality described in the following provided by the server 106 may be understood to be provided by an arrangement of servers or server computers.

The data storage 108 may for example be part of a cloud-based system 107 provided by a cloud storage provider to store and access data which it may use for taking decisions, such as information about the location of passengers and vehicles, their history (earlier bookings and routes taken) etc.

For the operator of an e-hailing service, it is of high importance that there is a proper assignment of vehicles to customers since this has an impact of the customer satisfaction as well as on the efficient operation of the whole e-hailing service system.

To problem of finding such an assignment, in general of all tasks to agents, e.g. given n agents and n tasks, can be seen as a problem of combinatorial optimization. In the example of an e-hailing service, the server 106, for example, assigns n (currently available) vehicles to n passengers (currently having hailed a ride, i.e. sent a request for being transported). The assignment problem can be considered as a linear sum assignment problem, where agents can perform any tasks given to it at the expense of a predefined cost. According to the linear sum assignment problem at most one task should be assigned to each agent and at most one agent should be assigned to each task such that the overall cost of the assignment is minimized. The assignment problem may be solved using a weighted bipartite graph formulation and solving it as a graph matching problem, where the most well-known approach is known as the Hungarian algorithm.

However, in many applications such as image key-point matching, the true cost of an assignment in the weighted bipartite graph is unknown. This may also be the case for an assignment in a transport service context as described above. Classical approaches such as the Hungarian algorithm fail to achieve the assignment in such cases. Therefore, according to various embodiments, a learning-based method is used for determining the assignment of vehicles to transport tasks. According to various embodiments, an approach is used which is based on learning sufficiently representative features and the comparison of a transport task graph and a vehicle graph.

More specifically, according to various embodiments, a combination of graph neural networks (GNNs) and approximate inference is used to encourage the learning of the determination of latent representations (node features) for a graph matching problem. This can be seen to be based on the observation that the graph matching problem is similar to that of a graph isomorphism test. Thus, according to various embodiments, the representation power of graph neural networks is exploited to extract distinctive node features, followed by the application of a differentiable approximate inference algorithm for matching.

Figure 2:
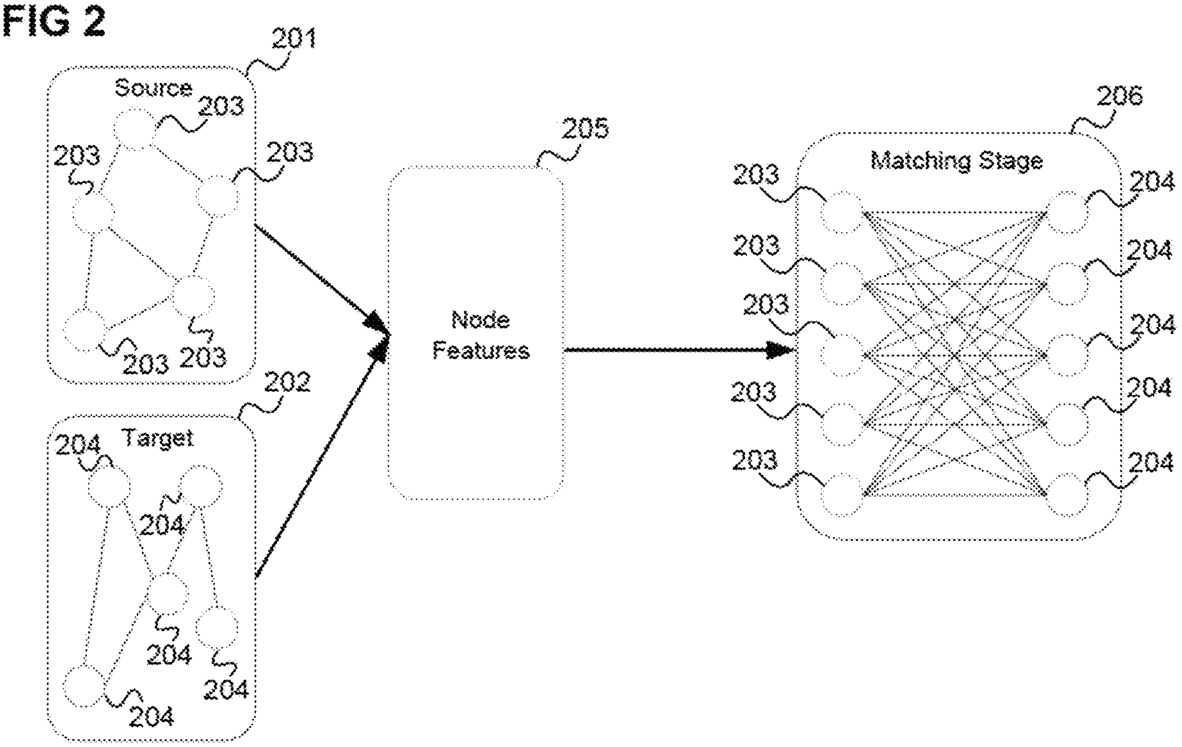
FIG. 2 illustrates an approach for determining an assignment of transport tasks to vehicles.

FIG. 2 illustrates an approach for determining an assignment of transport tasks to vehicles.

The transport tasks are for example passengers of an e-hailing service.

Since all passengers need to be assigned to vehicles but not necessarily all vehicles need to be assigned to a passenger, the passengers are arranged in a source graph (transport graph) 201 having a transport task graph node 203 for each transport task and the vehicles are arranged in a target graph (vehicle graph) 202 having a vehicle graph node 204 for each vehicle. For both graphs 201, 202, node features (e.g. features of the graph nodes) 205 are determined and a differentiable matching stage 206 determines the assignment of transport task graph nodes 203 to vehicle graph nodes 204 and thus of transport tasks to vehicles.

Figure 3:
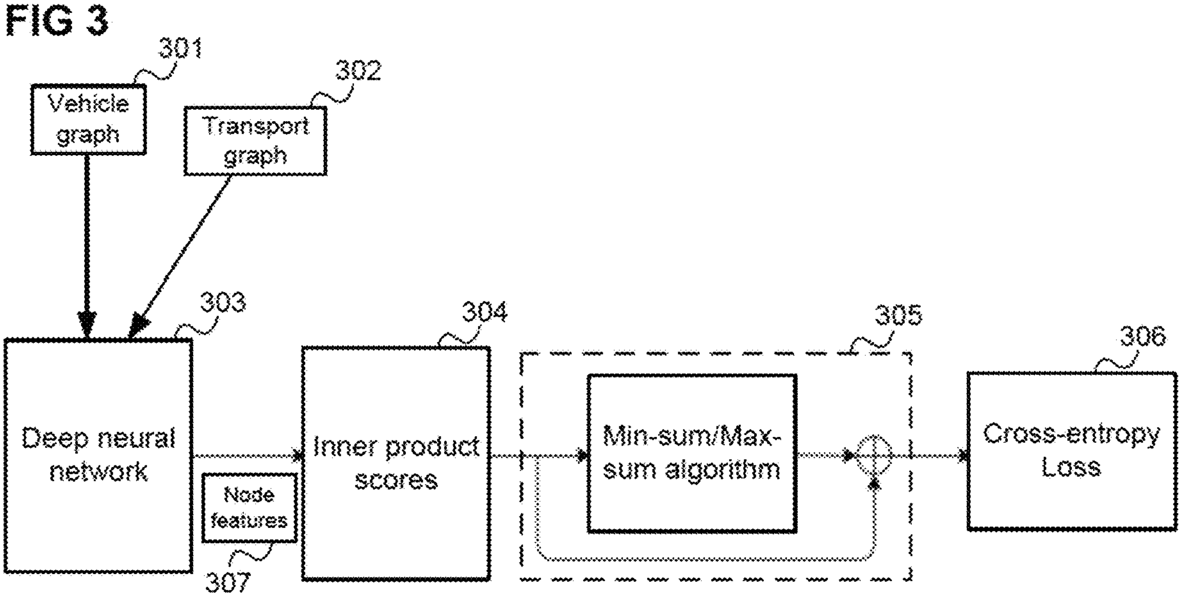
FIG. 3 illustrates an implementation of the approach of FIG. 2.

FIG. 3 illustrates an implementation of the approach of FIG. 2.

A transport task graph 301 (corresponding to source graph 201) and a vehicle graph 302 (corresponding to target graph 202) are fed to a deep neural graphical feature extraction network 303 determining node features 307 (corresponding to node features 205). The neural network 303 determines a node feature 307 for each node of the transport task graph 301 and the vehicle graph 302. Possibly, only the nodes (with associated input feature information) of the transport task graph 301 and the vehicle graph 302 are fed into the neural network 303 and the neural network 303 determines itself edges and (optionally) edge weights, for example depending on the similarity of input features of the nodes (e.g. an edge is introduced if two vehicles are close to each other).

Each node feature 307 is a vector of a certain dimension (given by the architecture of the neural network 303, in particular the configuration of its final layer). For every pair of a node of the transport task graph 301 and the vehicle graph 302, the features of the nodes are combined using vector inner product 304. The result of this combination is the weight between the nodes of the pair. When the transport task graph 301 and the vehicle graph 302 are seen together as a single bipartite graph, there are thus edges with these weights between the nodes of these two components of the bipartite graph, i.e. weights in a bipartite matching problem. This matching problem is solved by a matching solver 305.

Training data may be provided in form of training data elements, each including a (training) transport task graph and a (training) vehicle graph and an assignment of transport task nodes to vehicle graph nodes as label (e.g. determined from simulated travelling times and using the Hungarian algorithm). Using this training data, the neural network 303 may be trained using a loss function 306 (e.g. cross-entropy loss) by comparing the assignments output by the matching solver 305 with the labels. The combination of the neural network 303 and the matching solver 305 is thus end-to-end trainable. In particular, the neural network 303 is trained to determine descriptive node features for the assignment problem.

The neural network 303 is for example a geometric feature net.

Figure 4:
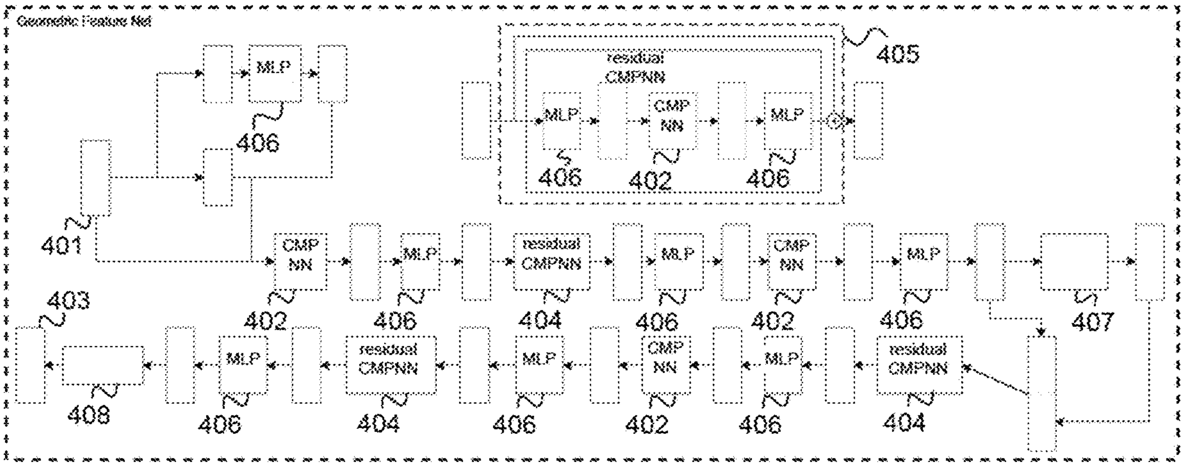
FIG. 4 shows an architecture for a neural network for determining node features for two input graphs.

FIG. 4 shows an architecture for a neural network 400 for determining node features for two input graphs.

In this example, the neural network only gets the graph nodes as input points (e.g. passengers or vehicles) and organizes them as a graph itself. The graph is constructed by connecting the k-nearest neighbours with edges. Then the graph and features are passed to a multiple CMPNN (Compositional Message Passing Neural Network) layers 402 to get the output node features 403.

The metric which defines whether nodes (e.g. passengers or vehicles are "near") may depend on node information input for each node (as input 401) to the neural network 400. The (input) node information may for example be location. Weights of edges may also be set depending on the node information (e.g. based on similarity of node information of two nodes, e.g. the closer two passengers are, the higher the weight of the edge).

The neural network 400 further includes residual CMPNN layers 404 which helps to train very deep neural works. Block 405 illustrates a residual CMPNN layer. Additionally, the neural network 400 includes multi-layer perceptrons (MLPs) 406, max pooling 407 and normalization 408. The empty boxes in FIG. 4 are intermediate Use Gap Code results (except for input 401, output 403, max pooling 407 and normalization 408). The three branches directly following the input serve for generating the edges of the respective graph from the input node features.

The matching solver 305 may operate according to an inference algorithm which determines an approximate assignment (i.e. matching of nodes of the two graphs) and has differentiable operations. An example is the e.g. a K-iteration Minsum algorithm as follows:

Layer Min-Sum Algorithm

Input: Edge weight matrix S, total number of iterations K

Output: Updated messages $M^{K}_{\alpha\to\beta} := M^{K}_{\beta\to\alpha}$ initialize $M^{0}_{\alpha\to\beta} := S$, $M^{0}_{\beta\to\alpha} := S^{\top}$, $W := S$, $k := 0$ for k ∈ {1, . . . , K} do

| Update $M^{K}_{\alpha\to\beta}$:

| $i_1 = \text{argmax}_{1\le j\le n} M^{k-1}_{\beta\to\alpha_j}$

| $i_2 = \text{argmax}_{1\le j\le n, j\ne i} M^{k-1}_{beta\to\alpha_j}$

| $A_1 = M^{k-1}_{\beta\to\alpha_{i_1}}$

| $A_2 = M^{k-1}_{\beta\to\alpha_{i_2}}$

| $M^{k}_{\alpha\to\beta} = W^{\top} - A_1$

| $M^{k}_{\alpha_{i_i}\to\beta} = M^{k}_{\alpha_{i_1}\to\beta} + A_1$

| $M^{k}_{\alpha_{i_1}\to\beta} = M^{k}_{\alpha_{i_1}\to\beta} - A_2$

| Update $M^{k}_{\beta\to\alpha}$:

| $i_1 = \text{argmax}_{1\le j\le n} M^{k-1}_{\alpha\to\beta_j}$

| $i_2 = \text{argmax}_{1\le j\le n, j\ne i_1} M^{k-1}_{\alpha\to\beta_j}$

| $A_1 = M^{k-1}_{\alpha\to\beta_{i_1}}$

| $A_2 = M^{k-1}_{\alpha\to\beta_{i_2}}$

| $M^{k}_{\beta\to\alpha} = W - A_1$

| $M^{k}_{\beta_{i_1}\to\alpha} = M^{k-1}_{\beta_{i_1}\to\alpha} + A_1$

└ $M^{k}_{\beta_{i_1}\to\alpha} = M^{k}_{\beta_{i_1}\to\alpha} - A_2$

The algorithm above seeks to select edges (and thus assignments) between the nodes of two components of a bipartite graph (one component having nodes ai and the other having nodes 3$i$) such that the sum of the selected edge weights is maximal. Local constraints are enforced such that the resulting selected edges form a matching set. This matching set is effectively the assignment (output by the inference 305 in FIG. 3).

In the algorithm described above, the matching operations are implemented as a layer which can be easily integrated to work with neural networks and learning methods. It can be seen as a layered implementation, in the sense that data and operations can be arranged such that computations may be constructed where gradients can flow.

In the algorithm above, A1 refers to the maximum message being sent across a set of nodes. A2 refers to the maximum message being sent across a set of nodes excluding A1. This means that A2 is the second largest message being sent.

It should be noted that according to various embodiments, in the algorithm above, each "belief" of a node is interpreted as a probability. The algorithm may operate in log-space and a negative log is taken (since probabilities are negative when taking the logarithm). This does not change the interpretation of the algorithm, it still finds the maximal weight matching.

The transport task graph 201 and the vehicle graph 202 may encode local influences via node information (i.e. values of nodes), edges and weights of edges between nodes (i.e. between passengers and between vehicles). In particular, the graphs 201, 202 are constructed by connecting passengers amongst themselves and vehicles amongst themselves. This may be done by connecting k-nearest neighbours as described with reference to of FIG. 4, wherein the distance metric (to define what is "nearest") may depend on node (i.e. passenger or vehicle) information, in particular location of the passenger and vehicle.

This gives the two graphs to match. The transport task graph 201 and the vehicle graph 202 serve to represent each individual task and vehicle (e.g. passenger and vehicle), as well as the influences on each other. For example, having many passengers near each other (i.e. having a similar location) can be seen to represent some form of demand indicator in the world. Likewise, a large pool of vehicles in a region determines the supply in the region, and can possibly represent traffic conditions. Feature inputs for vehicles and passengers (i.e. node information for the transport task graph 201 and the vehicle graph 202) may for example be driver quality (driver rating based on history) and the information that a vehicle is currently performing a transport task but will be able to perform another transport task soon as well as geographical information like location coordinates.

Using the graphs 301, 302 allows capturing real-time influences across the individual passengers and vehicles, and also allows accounting for locality in the world. Even if graphs not contributed in this manner, the graph information (node information and edges and edge weights) features would be translated by the neural network 303, which allows having an assignment determination scheme which is differentiable from end to end. The determination scheme is hence versatile and has high trainable representation power. Since the assignment scheme can be trained directly, there is no need for an additional solver to ensure one-to-one constraints. Also, the assignment result directly depends on the input features, opening possibilities of a more personalized assignment.

Having a learnable end-to-end assignment allows training the assignment scheme by reinforcement learning. Since assignments are performed instantaneously, they can be suboptimal when considering over a (possibly short) period of time, as illustrated in FIG. 5.

Figure 5:
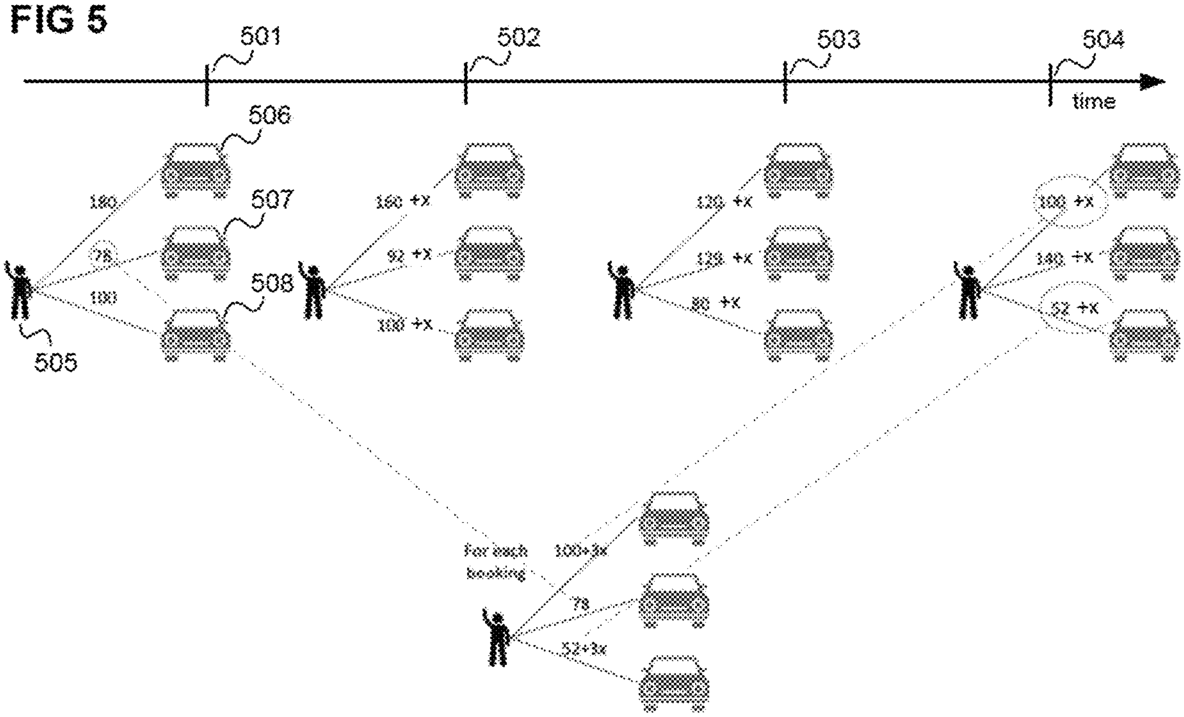
FIG. 5 illustrates an example for a change of an optimal assignment for a given transport task over time.

FIG. 5 illustrates an example for a change of an optimal assignment for a given transport task over time.

In this example, a passenger 505 hails a taxi at a first point in time. In this example, at the first point in time, a first taxi 506 is estimated to take 180 seconds to arrive at the passenger 505, a second taxi 507 is estimated to take 78 seconds to arrive at the passenger 505 and a third taxi is estimated to take 100 seconds to arrive at the passenger 505. So, from the point of view of the first point in time 501, the second taxi 507 would be the optimal choice.

However, assume that the decision is postponed until a second point of time 502 which is x seconds after the first point in time 501, where x is the assignment interval, i.e. the granularity at which the e-hailing server 106 performs assignments.

Since the passenger needs to wait the x seconds to the second point of time, this has to be added to every waiting time. Other than that, the waiting times have changed since the vehicles 506, 507, 508, depending on how they are currently travelling, the traffic the conditions they encountered (which may be better or worse than assumed for the estimation of the travel times) etc.

In this example, at the second point in time 502, the first taxi 506 is estimated to take 160 seconds to arrive at the passenger 505, the second taxi 507 is estimated to take 92 seconds to arrive at the passenger 505 and the third taxi is estimated to take 100 seconds to arrive at the passenger 505.

Similarly, at a third point in time 503 (which is again x seconds later), the first taxi 506 is estimated to take 120 seconds to arrive at the passenger 505, the second taxi 507 is estimated to take 129 seconds to arrive at the passenger 505 and the third taxi is estimated to take 80 seconds to arrive at the passenger 505.

Similarly, at a third point in time 504 (which is again x seconds later), the first taxi 506 is estimated to take 100 seconds to arrive at the passenger 505, the second taxi 507 is estimated to take 140 seconds to arrive at the passenger 505 and the third taxi is estimated to take 52 seconds to arrive at the passenger 505.

Now, assuming that x is sufficiently small, taking the minima for all vehicles 506, 507, 508 over the four points in time, gives 100+3x for the first taxi 506, 78 for the second taxi 507 and 52+3x seconds for the third taxi 508.

So, (if 52+3x is smaller than 78) the third taxi 508 may in fact be the optimal choice.

If at every point in time (in particular the first point in time 501) passengers were assigned to vehicles, the passenger 505 would be assigned the vehicle with the smallest possible waiting time at the first point in time (i.e. the second vehicle 507 with 78*s* waiting time). However, from a later point of view, another vehicle (here the third vehicle 508) may be more beneficial. This may for example occur because a driver turns an app for participating as driver after the first point of time (e.g. in accordance with a certain pattern, e.g. at certain times of the day at certain locations), or if the driver takes a U-turn that significantly reduces estimated arrival time to the passenger.

Having a differentiable assignment scheme, combined with representing vehicles and passengers by means of the graphs and the neural network allow formulating the assignment problem as a reinforcement learning one.

This means that while as described above, according to various embodiments, labeled data (matching pairs) may be used to guide the feature learning, such training data may not be available and reinforcement learning may be used instead. This is because assigning passengers and drivers is typically a highly dynamic scenario as illustrated in FIG. 5. In that case, real labels may not be available or there may be only access to arbitrarily created ones. If that is the case, the Min-Sum layer (matching solver 305) may be relied on to influence the matching procedure, and the neural network (as part of the assignment pipeline) learns to determine representation using reinforcement learning instead of labels. Because the Min-Sum layer is differentiable, matching can be propagated directly down the network.

In other words, the graph neural network may be trained using reinforcement learning (e.g. in operation, i.e. while controlling the transport system), e.g. by gathering rewards (e.g. comparing overall waiting times with waiting times achieved with another (e.g. conventional) assignment scheme).

Figure 6:
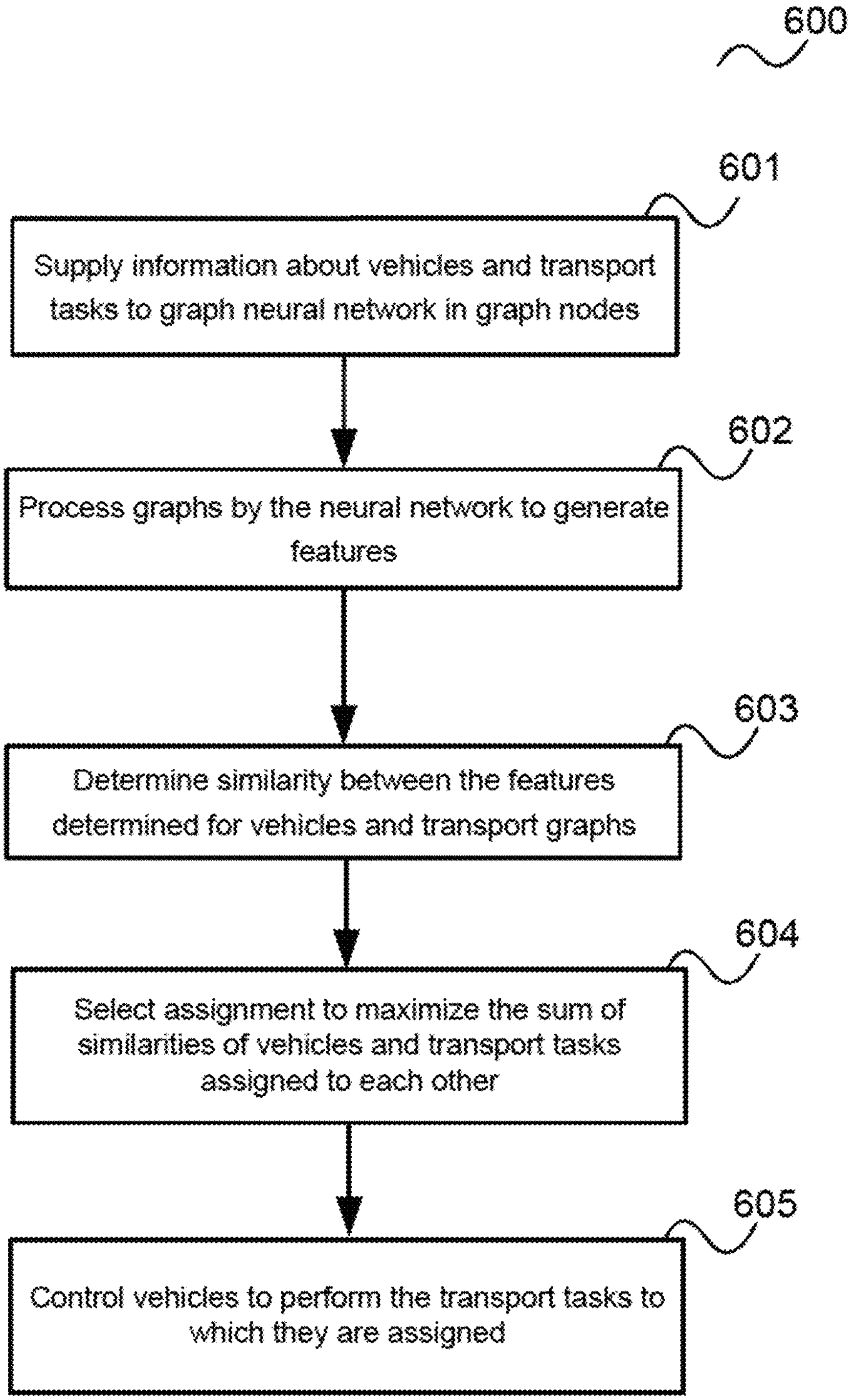
FIG. 6 shows a flow diagram illustrating a method for controlling vehicles to perform transport tasks.

In summary, according to various embodiments, a method is provided as illustrated in FIG. 6.

FIG. 6 shows a flow diagram 600 illustrating a method for controlling vehicles to perform transport tasks.

In 601, information about the vehicles and information about the transport tasks is supplied to a graph neural network by associating each vehicle with a graph node of a vehicle graph and each transport task with a graph node of a transport task graph.

In 602, the vehicle graph and the transport graph are processed by the neural network, wherein the graph neural network is a neural network trained to determine a feature for each graph node of a graph it processes.

In 603, for each pair of a graph node of the transport task graph and a graph node of the vehicle graph, a weight representing a similarity between the feature determined for the graph node of the transport task graph and the graph node of the vehicle graph is determined.

In 604, an assignment between the graph nodes of the transport task graph and the graph nodes of the vehicle graph are selected from a set of possible assignments, wherein the selected assignment maximizes, among the possible assignments, the sum, over the pairs of graph node of the transport task graph and graph node of the vehicle graph node which are assigned to each other, of the weights of the pairs.

In 605, each vehicle which is assigned to a transport task according to the selected assignment is controlled to perform the transport task.

According to various embodiments, in other words, an assignment of vehicles to transport tasks is performed by a matching solver on the basis of (output) features of vehicles and transport tasks derived by a graph neural network from a vehicle graph (having a node for each vehicle with associated input features) and a transport task graph (having a node for each transport task with associated input features).

Thus, matching constraints can be seen to be encoded into a learning neural network. This in particular allows learning with additional bias which improves the rate of learning, allowing learning an efficient assignment determiner quickly. The whole pipeline of neural network and matching solver can be trained end-to-end. Thus, the neural network is trained to output features which are suitable for the matching task. It can be achieved that the neural network is permutation invariant and stable in learning (in particular robust to noise).

The approach of FIG. 6 allows for example training of a mechanism for assignment of vehicles to passengers based on vehicle and passenger features which is more accurate that an assignment based on, for example, estimates of travel times (which are potentially inaccurate). It allows taking into account live information and possible local external influences such as demand or supply surges, and traffic patterns.

It should be noted that the term transport service is not merely to be understood as a transport of passengers (i.e. a taxi or e-hailing service) but also includes transport of food and/or beverages (i.e. the transport service may be a food/beverage service) letters and parcels (i.e. may be a mail transport service) etc.

The vehicles may be autonomous vehicles. Thus, the approach of FIG. 6 provides a control of a robotic system (including a plurality of robotic agents in the form of autonomous vehicles).

The methods described herein may be performed and the various processing or computation units and the devices and computing entities described herein may be implemented by one or more circuits. In an embodiment, a "circuit" may be understood as any kind of a logic implementing entity, which may be hardware, software, firmware, or any combination thereof. Thus, in an embodiment, a "circuit" may be a hard-wired logic circuit or a programmable logic circuit such as a programmable processor, e.g. a microprocessor. A "circuit" may also be software being implemented or executed by a processor, e.g. any kind of computer program, e.g. a computer program using a virtual machine code. Any other kind of implementation of the respective functions which are described herein may also be understood as a "circuit" in accordance with an alternative embodiment.

While the disclosure has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method for controlling vehicles to perform transport tasks comprising:

- supplying information about the vehicles and information about the transport tasks to a graph neural network by associating each vehicle with a graph node of a vehicle graph and each transport task with a graph node of a transport task graph;
- processing the vehicle graph and the transport task graph by the graph neural network, wherein the graph neural network is a neural network trained to determine a feature for each graph node of a graph it processes, and wherein the vehicle graph and the transport task graph encode local influences via node information, edges, weights of edges between nodes of the vehicle graph, and weights of edges between nodes of the transport task graph;
- determining, by the graph neural network, for each pair of a graph node of the transport task graph and a graph node of the vehicle graph, a weight representing a similarity between the feature determined for the graph node of the transport task graph and the graph node of the vehicle graph, wherein the weight is determined based on the encoded local influences;
- capturing, by the graph neural network, dynamic real-time changes in the weights;
- selecting an assignment between graph nodes of the transport task graph and graph nodes of the vehicle graph from a set of possible assignments, based on the real-time changes in the weights, wherein the selected assignment maximizes, among the possible assignments, a sum, over pairs of graph node of the transport task graph and graph node of the vehicle graph which are assigned to each other, of weights of the pairs; and
- autonomously controlling each vehicle which is assigned to a transport task according to the selected assignment to perform the transport task.

2. The method of claim 1, wherein each feature is a vector of a predetermined dimension and the weight between the feature determined for the graph node of the transport task graph and the graph node of the vehicle graph is given by the inner product of the feature determined for the graph node of the transport task graph and the graph node of the vehicle graph.

3. The method of claim 1, wherein selecting the assignment comprises applying an assignment problem algorithm to a bipartite graph having the vehicle graph as first graph component, the transport task graph as second graph component, and edges between the first graph component and the second graph component with the determined weights.

4. The method of claim 3, wherein the assignment problem algorithm is a min-sum or a max-sum algorithm.

5. The method of claim 3, wherein the assignment problem algorithm has a fixed number of iterations.

6. The method of claim 3, wherein the assignment problem algorithm is differentiable.

7. The method of claim 1, comprising supplying, for each vehicle, information about the vehicle as one or more input feature values for the graph node of the vehicle graph associated with the vehicle to the graph neural network, and, for each transport task, information about the transport task as one or more input feature values for the graph node of the transport task graph associated with the transport task to the graph neural network.

8. The method of claim 7, wherein the vehicle graph comprises edges between graph nodes depending on a similarity of the input feature values of the graph nodes and wherein the transport task graph comprises edges between graph nodes depending on the similarity of the input feature values of the graph nodes.

9. The method of claim 1, wherein, for at least some of the vehicles, the information about the vehicles comprises location information of the vehicles.

10. The method of claim 1, wherein each transport task comprises picking up an object or person to transport and, for at least some of the transport tasks, the information about the transport tasks comprises location information about where the object or person needs to be picked up.

11. The method of claim 1, comprising training the graph neural network using reinforcement learning.

12. A non-transitory computer-readable medium comprising program instructions, which, when executed by one or more processors, cause the one or more processors to perform a method for controlling vehicles to perform transport tasks, the method comprising:

- supplying information about the vehicles and information about the transport tasks to a graph neural network by associating each vehicle with a graph node of a vehicle graph and each transport task with a graph node of a transport task graph;
- processing the vehicle graph and the transport task graph by the graph neural network, wherein the graph neural network is a neural network trained to determine feature for each graph node of a graph it processes, and wherein the vehicle graph and the transport task graph encode local influences via node information, edges, weights of edges between nodes of the vehicle graph, and weights of edges between nodes of the transport task graph;
- determining, by the graph neural network, for each pair of a graph node of the transport task graph and a graph node of the vehicle graph, a weight representing a similarity between the feature determined for the graph node of the transport task graph and the graph node of the vehicle graph, wherein the weight is determined based on the encoded local influences;
- capturing, by the graph neural network, dynamic real-time changes in the weights;

selecting an assignment between graph nodes of the transport task graph and graph nodes of the vehicle graph from a set of possible assignments, based on the real-time changes in the weights, wherein the selected assignment maximizes, among the possible assignments, a sum, over pairs of graph node of the transport task graph and graph node of the vehicle graph which are assigned to each other, of weights of the pairs; and autonomously controlling each vehicle which is assigned to a transport task according to the selected assignment to perform the transport task.

13. The method of claim 1, wherein the local influences comprise supply and demand surges and traffic patterns.

* * * * *